United States Patent
Sapia

(10) Patent No.: US 11,380,452 B2
(45) Date of Patent: Jul. 5, 2022

(54) SYSTEMS AND METHODS FOR POSITION VERIFICATION FOR INSPECTION AND REPAIRS

(71) Applicant: GE-Hitachi Nuclear Energy Americas LLC, Wilmington, NC (US)

(72) Inventor: Mark A. Sapia, Canton, CT (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 1124 days.

(21) Appl. No.: 15/452,708

(22) Filed: Mar. 7, 2017

(65) Prior Publication Data

US 2018/0261344 A1 Sep. 13, 2018

(51) Int. Cl.
| G21C 17/003 | (2006.01) |
| G01S 15/42 | (2006.01) |
| G01S 15/06 | (2006.01) |
| G01S 15/88 | (2006.01) |

(52) U.S. Cl.
CPC ............ *G21C 17/003* (2013.01); *G01S 15/06* (2013.01); *G01S 15/42* (2013.01); *G01S 15/88* (2013.01)

(58) Field of Classification Search
CPC ....... G21C 17/003; G01S 15/88; G01S 15/06; G01S 15/42
See application file for complete search history.

(56) References Cited

U.S. PATENT DOCUMENTS

| 4,428,237 | A * | 1/1984 | Zeger ................. G01N 29/4463 73/602 |
| 6,904,817 | B2 | 6/2005 | Davis et al. |
| 8,111,802 | B2 | 2/2012 | Rowell et al. |
| 8,228,058 | B2 | 7/2012 | Nishimizu et al. |
| 8,485,036 | B2 | 7/2013 | Crumpton et al. |
| 9,177,677 | B2 | 11/2015 | Kurosawa et al. |
| 2007/0157730 | A1* | 7/2007 | Ochiai ................. G21C 17/003 73/627 |
| 2008/0000299 | A1* | 1/2008 | Georgeson ........... G01N 29/223 73/606 |
| 2009/0009488 | A1* | 1/2009 | D'Souza .............. G06F 3/0436 345/177 |

(Continued)

OTHER PUBLICATIONS

Sibul, Adaptive Signal Processing, 2017.

*Primary Examiner* — John W Lee
(74) *Attorney, Agent, or Firm* — Ryan Alley IP

(57) ABSTRACT

NDE probes provide unique data signals from a remote object such that can be used to accurately and precisely locate a position. With a computer processor, the data signals are converted into a positional fingerprint that is compact and easily analyzed as a file or information of probe position. The positional fingerprint is stored in association with the position or object to verify a same position at another time. Another probe detects other data signals for the object at another time. Under a similar transformation into a positional fingerprint, the position of the other probe can be matched to the first by comparing positional fingerprints. The comparison may use a probabilistic comparison and/or compare several different fingerprints from several different locations and times to ensure a best match. Position verification between probes may ensure a repair has been completed in the proper location, verify system integrity or investigate potential problems.

20 Claims, 2 Drawing Sheets

(56) References Cited

U.S. PATENT DOCUMENTS

2012/0310551 A1\* 12/2012 Na .................... G01N 29/0645
 702/39
2015/0323922 A1\* 11/2015 Fletcher ................ B25J 9/1687
 700/192

\* cited by examiner

SYSTEMS AND METHODS FOR POSITION VERIFICATION FOR INSPECTION AND REPAIRS

BACKGROUND

Non-destructive testing is used throughout construction, power generation, and aeronautics industries in both manufacture/fabrication and during life of use, where various testing protocols and devices are used during maintenance, at set intervals, or following operations-impacting events. For example, ultrasonic testing allows non-destructive verification of surfaces and interiors of various structures whose integrity may be important for operations and safety. Ultrasonic testing in particular can be used by portable devices that use acoustic signals to determine a tested structure's integrity, shape, internal configuration, etc. Non-destructive testing can also include visual inspection, non-visual electromagnetic inspection (like eddy current or magnetic flux leakage), radiographic inspection with x-ray or gamma radiation, magnetic resonance inspection, etc.

Whenever inspecting or testing components for failure, results typically must be paired with a relatively accurate location of the tested structure in order to verify integrity and dimensions at expected locations as well as give accurate position of detected anomalies. Where a tested structure is inaccessible or difficult to visualize by a human operator or visually-verifying program, indirect methods of verifying tested structure location can be used. For example, a testing probe may be locked on a set of tracks at known positions to verify probe position and then verify tested structure position. Or a testing probe may be positioned at verifiable locations via RFID or optical tags to derive tested structure position. Or, for example, a robotic scanner may be tracked from a starting location with the use of optical and/or magnetic encoders. Resolvers may also be used, and resolver signals can be converted to encoded position values.

SUMMARY

Example embodiments include probes capable of inspecting and/or repairing a remote object in a nuclear power plant. Example devices include a receiver configured to receive signal data associated with the object at a position of interest. For example, eddy current probes, ultrasonic testers, video cameras, etc. may all be used as example devices. Example devices may be freeform with their own locomotion, such as a drone or wheeled robot, or attached to the object via gearing or on a work trolley, for example. Example embodiment devices include or are connected to a computer processor configured to execute at least a portion of example methods of positional verification. Multiple devices may be used across several separate operations to achieve a same precise position among all devices at different instances.

Example methods include verifying positions of interest, such as locations of flows, repairs, and/or inspections in nuclear power plants. Example methods first gather signal data of the object where position is important, such as at an inspection feature or where a defect or other characteristic of interest is found. The signal data may be captured by an ultrasonic tester, camera, eddy current detector, or other detection device. That signal data is then converted by a computer into a positional "fingerprint"—a simplified but characteristic data set that can be used to verify other signals at the position. For example, a Fourier transform, selections from the signal data's frequency domain, and/or any other detectable characteristics. The positional fingerprint is stored in association with the position or object to verify a same position at another time. Other data signals for the object may then be gathered at any time and, transformed to a comparable fingerprint, used to determine if a same position is achieved by the later measuring device. The comparison may use a probabilistic comparison and/or compare several different fingerprints in both the database and from different locations to ensure a best match. Such verification may be used to ensure a repair has been completed in the proper location, verify system integrity, investigate potential system problems, etc.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
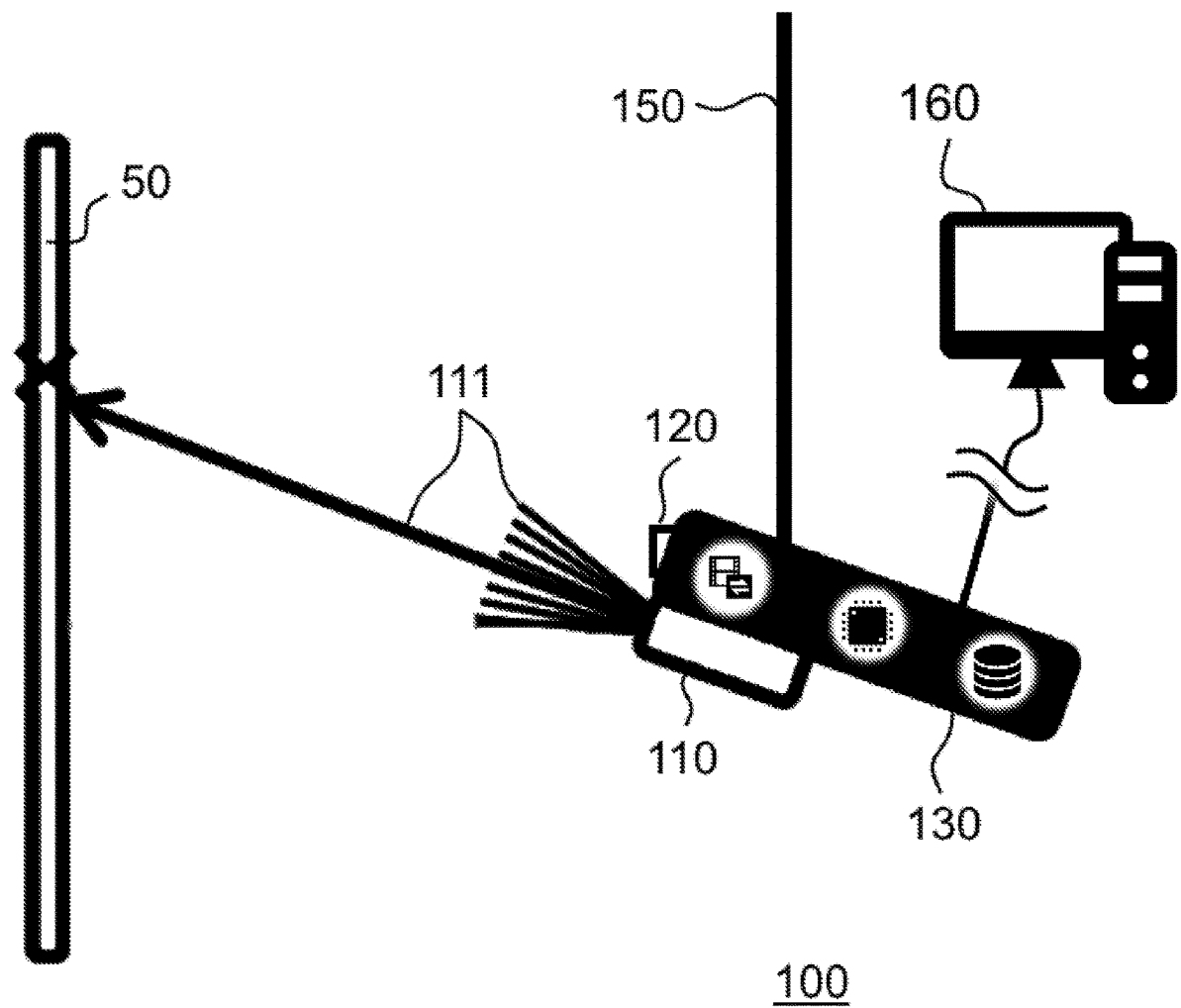
FIG. 1 is a schematic of an example embodiment probe.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventor has recognized that inspection and repair operations must be coordinated to match position of inspection precisely with repair position in order to verify that a needed repair has been achieved. In complex industrial or hazardous locations, such as nuclear reactor plant piping and internals, such inspection and repair may be carried out by robots or other remote tooling that cannot be easily verified positionally by operators. For example, different probes and repair robots may be used in inspection and repair activities with varying ability to determine a positional match between the two. Device slippage and complex movements, such as through piping elbows or around dense and complex industrial systems, significantly undermines the value of such encoding, such that precise position verification between inspection, testing, and/or repair may be lost. Precisely locating a position inside or on a pipe, or inside a reactor vessel, is impaired by wheel slippage or variation in robotic travel path "cork-screwing" inside a pipe as the robot travels. Or differences in travel distance between intrados and extrados of a bend may cause imprecise locating during NDE examinations. Such locational problems may be exacerbated when returning to a location to follow up with additional inspections or to conduct a repair. Tracking robots and other local position matching devices may also be degraded by local radioactivity, especially in areas inaccessible to humans. Naked eye visual verification is often unreliable or impossible in remote areas, so the positional problem may require complex encoders be used in any testing and repair devices to exactly match traverse distance of the devices with physical dimensions. Example embodiments described below address these and other problems recognized by the inventor with unique solutions enabled by example embodiments.

The present invention is positional verification devices and methods for use in inspecting, testing, and/or repairing systems. In contrast to the present invention, the few example embodiments and example methods discussed below illustrate just a subset of the variety of different configurations that can be used as and/or in connection with the present invention.

Several different types and configurations for inspection and repair devices exist for probing and conducting repairs on remote components, including isolated nuclear plant piping. Co-owned U.S. Pat. No. 8,111,802 issued Feb. 7, 2012; U.S. Pat. No. 6,904,817 issued Jun. 14, 2005; U.S. Pat. No. 9,177,677 issued Nov. 3, 2015; U.S. Pat. No. 8,485,036 issued Jul. 16, 2013; and U.S. Pat. No. 8,228,058 issued Jul. 24, 2012 describe related inspection and repair devices useable as or with example embodiments, and all these patents are incorporated herein by reference in their entireties. Because example embodiment devices may be used for inspection, repair, both, or any other instance where positional recording and/or analysis is useful, it is understood that example embodiments may be used as any of the incorporated inspection and repair devices, combined or alone.

Figure 2:
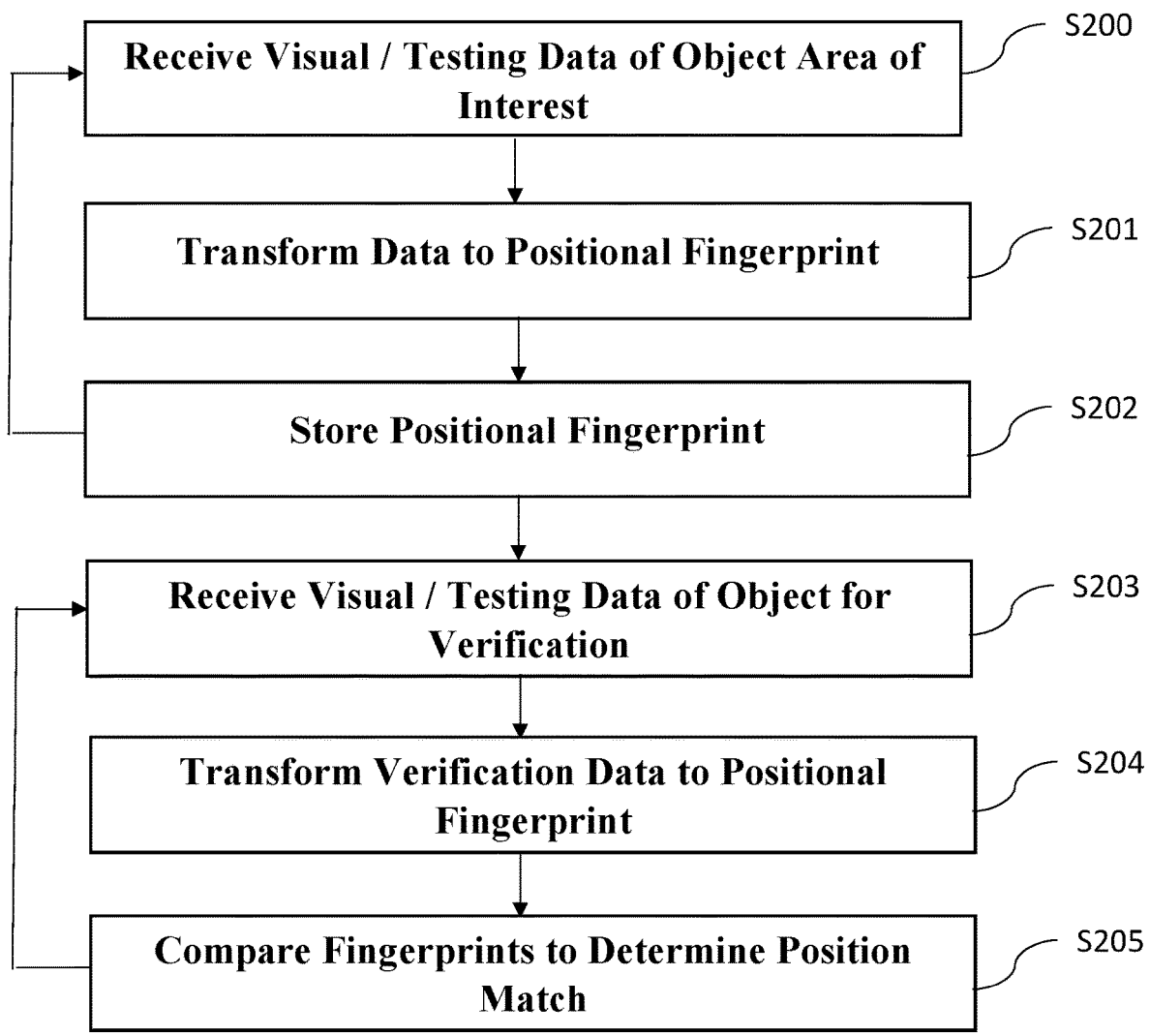
FIG. 2 is a flow chart illustrating an example method.

FIG. 2 is a schematic of an example embodiment probe 100 useable in a variety of environments, including in submerged nuclear reactor environments, in extended pipe interiors including elbows and changing diameters, remote or inaccessible nuclear plant locations, etc. where an object of interest 50, like a pipe weld or reactor pressure vessel wall, are located. As shown in FIG. 2, example embodiment device 100 may include a testing or repair device 110, such as an ultrasonic tester that may include an ultrasonic emitter and/or sensor that uses ultrasonic vibration to detect object 50 position within a fluid medium as well as density/material changes within object 50. For example, testing device 110 may include an ultrasonic emitter capable of emitting ultrasonic bursts 111 in frequencies and amplitudes carried by common working mediums like light or heavy water and air, as well as at least partially reflectable by denser solids.

Additionally or alternatively, testing or repair device 110 may be a welding or annealing tool that can remotely repair cracks or welds in object 50. For example, testing or repair device 110 may be a welding torch positionable by example embodiment device 100 to repair cracks to weld together broken parts of object 50, such as a pipe interior. Or for example, testing or repair device 110 may be a pneumatic sprayer or other coating-applying device to seal or coat a surface of object 50 in need of repair. Of course, testing or repair device 110 may be entirely omitted, and example embodiment probe 100 may possess only visual recording and analysis configurations.

Example embodiment probe 100 may be on a positional guide 150, such as a cable from an overhead crane, tracks or other step-wise positional guides, or position index, that permits tracking and moving probe 100 to desired locations with verifiable relative position. Still further, example embodiment probe 100 may be self propelled and/or freely moveable, such as with a propulsion system when submerged in a fluid, or through a geared wheel system that engages with a pipe interior and allows lateral movement through the pipe.

Example embodiment probe 100 may include a visual recorder 120, which may be a camera or any light-sensitive capture device. Visual recorder 120 may be co-located with tester 110 so as to capture visual data from a same vantage as testing or repair device 110. Similarly, visual recorder 120 may be offset or present alone without device 110. Visual recorder 120 may include a lighting element to illuminate or otherwise provide desires observation conditions of object 50.

Visual recorder 120 may be configured to operate in a working fluid, such as at extreme depths of water in a nuclear reactor environment, or such as in remote, hazardous areas. As such, visual recorder 120 may be a camera sealed against higher pressures and/or hardened against irradiation or radionuclide particulate entrainment. Visual recorder 120 may include appropriate lens systems to capture and record and/or transmit visual data for processing or operator usage, even at great fluid depths or without external lighting.

Example embodiment probe 100 may also include an image processor 130 and/or may be remotely coupled with a computer 160 having image processing and storage configuration. For example, a processor and appropriate memory and bus may be in a portion of image processor 130 in FIG. 1. As such, example embodiment probe 100 may be capable of processing and/or analyzing received visual data as well as receive control signals. A processor may further interpret received operational or control signals and translate the same into behaviors of probe 100.

Image processor 130 and/or computer 160 may be programmed or configured with hardware that executes example methods discussed below to identify and verify location. Visual recorder 120, tester/repairer 110, image processor 130, computer 160, and any other electronic component of device 100 may be locally or remotely powered. For example, as shown in FIG. 1, guide 150 may provide external power to aspects of example embodiment device 100. Alternately or in addition, local batteries may power, or provide backup power to, some or all components, like visual inspection element 120, a processor, orientation determinator 130, wireless communicator, tester/repairer 110, etc. Example embodiment probe 100 may be programmed using the Robotic Operating System-Industrial (ROS-I) platform to control mobility, testing functions, image capture and/or other probe functionality.

Example embodiments can be used in a variety of ways to perform visual and nondestructive testing of components. For example, in a nuclear power plant, like a BWR, ESBWR, PWR, CANDU, or ABWR, areas, like underwater next to a component weld or in a spent fuel pool, example embodiment devices may be introduced to visually and/or ultrasonically test components for placement, internal integrity, shape, appearance, etc., with or without regard for set positioning of example embodiment devices. Example embodiment devices may also be used in conjunction with example methods discussed below, such as through appropriate programming or operator action. However, example embodiment devices may also engage in other behaviors and activities useful in inspection environments.

Example Methods

FIG. 2 is a flowchart illustrating an example method of positional determination using a testing and/or repair device, such as example embodiment probe 100. It is understood that example methods may be used in conjunction with nondestructive testing, repair operations, and or independent probing, wherever positional verification is desirable. As shown in FIG. 3, in S200 visual, ultrasonic testing, and/or other telemetry are received from appropriate detector(s), like an ultrasonic testing device or camera. For example, using an example embodiment probe 100 shown in FIG. 1, a user maneuvering the device about component 50 may collect data from testing or repair device 110, camera 120, 130, etc. being operated alongside component 50. Alternatively, any visual, ultrasonic, and/or other positional data may come from several different sources and even be derived from one-another. In S200, data may be retrieved in real-time and simultaneously, such as ultrasonic pings being detected and associated with particular video frames. Or, in S200, different types of data may be received asynchronously and stored or otherwise used at later points in time as other data is received.

As an example, the receiving of data in S200 may be executed during nondestructive testing performed on nuclear reactor components during an operational outage, simultaneously with inspection and other maintenance activity. Or, for example, receiving of data in S200 may be executed during repair operations or independent probing to determine and/or verify position. The data received in S200 may be visual, ultrasonic, eddy current, etc. of a detected flaw, non-damaged aspects of the object, and/or surrounding environmental objects. For example, in a repairing operation in an outage, a data regarding a flaw may be collected in S200 during inspection, for verification later during a repair. Or, for example, data regarding constant, surrounding objects may be collected in S200 in order to permit positional verification regardless of flaw repair status.

In S201, captured data is transformed to a positional fingerprint, which is defined as simpler, characteristic information that accurately reflects positional data of the object. A positional fingerprint is useable to verify data from a different time so as to determine a positional match between time and/or datasets. Several different methods may be used to execute the transform in S201. For example, a Fourier transform may be used on a waveform graph of a sonar inspection signal, ultrasonic signal, a 2-D image capture, or other data of the object to generate component frequencies of the signal, useable as a positional fingerprint. Similarly, other selections from the data's frequency domain could be used as the positional fingerprint. Or, for example, detected time/space domain, frequency, power, correlation, cepstrum, wavelet, and/or other detectable characteristics may be extracted from the data in S201 and transformed to a positional fingerprint. As seen in these examples, a positional fingerprint may be data of a list of frequency spikes or resonances or other characteristic data that is much simpler than the complete collected data in S200. Positional fingerprints, unique position identifying signals, may thus be contained concurrently with the inspection data and/or derived from unique noise patterns or other features such as machining marks.

The fingerprint may be generated in S201 by image or signal programming in the probe or connected computer, using installed signal or image processing software or hardware configuration. For example, a Fourier transform functionality in the probe itself, image processing software installed on a remote computer coupled with the detection device, and/or post-processing on captured data may be performed remotely to generate positional fingerprints in S202. As such, positional fingerprints in S201 may be generated in real time simultaneously with receipt of data in S200, or at a later time on saved data.

In S202, the generated positional fingerprint may be stored, potentially in correlation with a time, activity, operation, general location, flaw type, device orientation, etc. For example, an identified flaw in a pipe weld in a nuclear reactor may be detected during an outage inspection operation, and one or more positional fingerprints of the flaw itself and surrounding pipe can be stored in connection with an ID or description of the flaw for later repair. The fingerprint, which is simplified from any testing or visual signal, may be stored in local transient or persistent memory, in an associated database, and/or in a remote computer in S202. Actions S200-S202 may be repeated any number of times, for a single flaw or for any sequence of operations, so as to generate a database of positional fingerprints and times, operations, flaws, locations, ordered repairs, etc., permitting multiple positional fingerprints to be available for later verification.

At another point in time, position is verified using the positional fingerprint(s). In S203, compatible object data is captured, much in the same way as in S200 in a different operation. For example, initial data captured in S200 may be part of an inspection operation on a part, and different data in S203 may be captured as part of a repair operation on the same part; or, initial data in S200 and different data in S203 may be taken of a same part in successive monitoring actions to verify a known problem or situation maintains integrity or has not worsened.

In S204, the object data for positional verification is transformed to a positional fingerprint in a similar manner as in S201, such that the two fingerprints can be compared. In S205, the fingerprint from the original capture in S200 and different capture of S203 are compared to determine if a same position and potentially orientation are achieved by the device(s) receiving the data in S200 and S203.

Because the fingerprints are simplified characteristic data and absolute position matching is unlikely because of some slight error or variability in the data, there will often be slight differences between fingerprints, even for acceptably close locations. In order to determine a position match in S205 in spite of variances in fingerprints, a reliable predictive analytic technique may be used. For example, Naive-Bayes, K-Nearest Neighbors, K-Means Clustering, and/or Fisher Linear Discriminant Analyses may be used to probabilistically compare the two fingerprints. Or, for example, between two sets of captured images in S200 and S203, a Widrow's Adaptive Linear Combiner analysis may be used in S205 to estimate position match. Still further, any of the analyses from Sibul, Adaptive Signal Processing, 2007, submitted herewith and incorporated by reference in its entirety, including the analyses in its bibliography, may be employed in S205. These analyses may be customized to the type of fingerprints being analyzed and output a goodness of fit instead of a binary position match result. Users or software may compare the goodness of fit versus a threshold or other comparisons to determine if a position is likely matched between two sets of object data. Such adaptive analyses in S205 may be performed by software on the probe or repair tool itself, on a computer interfaced with the tool, or later based on captured data.

The capture, fingerprinting, and comparison in S203-S205 may be repeated for any number of different instances and compared against one or more stored fingerprint(s) from S202. For example, a user may repeatedly capture object data in S203 from a repair tool being moved to various positions, with position matches being output in S205 for each of the various positions. Once a threshold or best match is found between fingerprints of captured data in S205, the tool may be stopped at the position associated with the best match and a repair performed. Similarly, positions between successive inspections, or between installation and removal operations, or in repair and follow-up inspection operations may be compared in S205 to ensure a same position. Because positional fingerprints generated and compared in S201, S204 and S205 may be relatively simple yet characteristic of object data for a given location, their generation and storage may require minimal computational resources. Similarly, statistical comparison of relatively simple fingerprints may require minimal computation resources while yielding reliable indications of position matching between locations for which object data is received at different instances. In this way, many fingerprints for particular locations of interest may be generated and compared in example methods to ensure high positional precision, without requiring large amounts of raw data storage or involved processing times. Thus, quicker repairs, testing, and inspections may be achieved at reliably same positions to verify condition in industrial settings such as nuclear power plants where information location is critical for verifying system integrity.

Example embodiments and methods thus being described, it will be appreciated by one skilled in the art that the examples may be varied and substituted through routine experimentation while still falling within the scope of the following claims. For example, while an example embodiment may use visual imaging in a nuclear power plant during an inspection, it is understood that other example embodiments are useable, such as ultrasonic or eddy current nondestructive testing in aircraft wings, by accounting for the differing output signals and statistical variance between locations in these media. All such changes fall within the scope of the following claims, and such variations are not to be regarded as departure from the scope of the following claims.

What is claimed is:

1. A method verifying position of a tool, the method comprising:
    performing nondestructive testing on an object by transmitting nondestructive signals from an emitter onto the object;
    receiving, by a sensor at a position of interest, first signals generated by the nondestructive signals interacting with the object;
    transforming, with a computer processor, the first signals into a positional fingerprint of the position;
    storing, in a computer database, the positional fingerprint in association with the object;
    receiving second signals associated with the object at an unknown position of the tool;
    transforming, with a computer processor, the second signals into a positional fingerprint of the unknown position;
    comparing, with a computer processor, the positional fingerprint of the position with the positional fingerprint of the unknown position to determine if the tool is at the position of interest.

2. The method of claim 1, wherein the first signals are ultrasonic signals reflected from a flaw or eddy current signals created at a flaw in the object, wherein the tool is a repair tool, and wherein the position of interest is a position of the repair tool to repair the flaw.

3. The method of claim 1, wherein the tool is a repair tool including at least one of a welding tool and coating tool.

4. The method of claim 3, wherein the object is a nuclear power plant component, and wherein the first signals are reflections of or generated from the nondestructive testing signals from nondestructive testing being performed on the component.

5. The method of claim 1, wherein the first and the second signals are 2-D visual images of the object and its surroundings.

6. The method of claim 1, wherein the transforming the first signals and transforming the second signals includes at least one of a Fourier transform of the first and the second signals, a time/space domain, a power transform, a correlation transform, a cepstrum transform, and a wavelet transform.

7. The method of claim 6, wherein the positional fingerprint of the position is a simplified association of frequencies and magnitudes of the first signals.

8. The method of claim 1, wherein the comparing includes at least one of Naive-Mayes, K-Nearest Neighbors, K-Means Clustering, Fisher Linear Discriminant, and Widrow's Adaptive Linear Combiner analysis that produces a probabilistic likelihood of a match between the positional fingerprint of the position and the positional fingerprint of the unknown position.

9. The method of claim 8, wherein the analysis produces a probability that the unknown position matches the position of interest, and wherein a match is determined based on the probability falling above a threshold probability.

10. The method of claim 1, wherein the transmitting nondestructive signals, receiving first signals, transforming the first signals, and storing the positional fingerprint are repeated for a plurality of positions of interest in a first operation, and wherein the receiving second signals, transforming the second signals, and comparing the positional fingerprint of the position with the positional fingerprint of the unknown position are repeated for a plurality of unknown positions in a second operation.

11. The method of claim 10, wherein the first operation is an inspection operation in a nuclear power plant during an operation outage, and wherein the second operation is a repair operation performed with the tool on the object later during the outage.

12. The method of claim 10, wherein the comparing determines if the tool is at the position of interest based on a best probabilistic fit between one of the plurality of fingerprints from the first operation and one of the plurality of fingerprints from the second operation.

13. A device for nondestructive testing of a remote object in a nuclear power plant, the device comprising:
    a nondestructive testing emitter and receiver configured to transmit nondestructive signals from an emitter onto the object and receive, at a position of interest, first signals generated by the nondestructive signals interacting with the object; and
    a computer processor configured to,
       transform the first signals into a positional fingerprint of the position, and
       store, in a computer database, the positional fingerprint in association with the object.

14. The device of claim 13, wherein the nondestructive testing emitter and receiver is an ultrasonic emitter and receiver, wherein the first signals are ultrasonic signals reflected from a flaw in the object, and wherein the ultrasonic emitter and receiver are configured to be submerged in a fluid in the nuclear power plant; and
    a position guide configured to move the ultrasonic emitter and receiver in the fluid.

15. The device of claim 13, wherein the computer processor is further configured to transform the first signals using a Fourier transform, a time/space domain, a power transform, a correlation transform, a cepstrum transform, or a wavelet transform of the first signals.

16. The device of claim 15, wherein the positional fingerprint of the position is a simplified association of frequencies and magnitudes of the first signals.

17. The device of claim 13, wherein the computer processor is further configured to,
    receive second signals associated with the object at an unknown position,
    transform the second signals into a positional fingerprint of the unknown position, and
    compare the positional fingerprint of the position with the positional fingerprint of the unknown position to determine if the position of interest matches the unknown position.

18. The device of claim 17, wherein the computer processor is further configured to compare based on at least one of Naive-Mayes, K-Nearest Neighbors, K-Means Clustering, Fisher Linear Discriminant, and Widrow's Adaptive Linear Combiner analysis that produces a probabilistic likelihood of a match between the positional fingerprint of the position and the positional fingerprint of the unknown position.

19. The device of claim 18, wherein the analysis produces a probability that the unknown position matches the position of interest, and wherein a match is determined based on the probability falling above a threshold probability.

20. The device of claim 13, wherein the nondestructive testing emitter and receiver are a camera, and the first signals are 2-D images associated with the object at the position of interest, and wherein the position of interest is a flaw in the object.

* * * * *